United States Patent
Jadhav et al.

(10) Patent No.: US 9,641,582 B2
(45) Date of Patent: May 2, 2017

(54) BANDWIDTH MANAGEMENT DEVICE, CENTRAL MANAGEMENT DEVICE AND METHOD OF BANDWIDTH MANAGEMENT

(71) Applicant: Huawei Technologies Co., Ltd., Shenzhen (CN)

(72) Inventors: Rahul Arvind Jadhav, Bangalore (IN); Bingzhen Liu, Shenzhen (CN)

(73) Assignee: Huawei Techologies Co., Ltd., Shenzhen (CN)

( * ) Notice: Subject to any disclaimer, the term of this patent is extended or adjusted under 35 U.S.C. 154(b) by 0 days.

(21) Appl. No.: 14/555,113

(22) Filed: Nov. 26, 2014

(65) Prior Publication Data
US 2015/0106480 A1    Apr. 16, 2015

Related U.S. Application Data

(63) Continuation of application No. PCT/CN2013/073991, filed on Apr. 10, 2013.

(30) Foreign Application Priority Data

Oct. 29, 2012    (IN) .................. IN4500/CHE/2012

(51) Int. Cl.
*H04L 29/06* (2006.01)
*H04L 12/26* (2006.01)
(Continued)

(52) U.S. Cl.
CPC .......... *H04L 65/60* (2013.01); *H04L 41/0896* (2013.01); *H04L 41/5054* (2013.01);
(Continued)

(58) Field of Classification Search
CPC ............... H04L 41/0896; H04L 47/805; H04L 41/5054; H04L 47/803; H04L 47/808; H04L 43/062
See application file for complete search history.

(56) References Cited

U.S. PATENT DOCUMENTS

| | | | |
|---|---|---|---|
| 8,000,235 B2 * | 8/2011 | Noy et al. | ...................... 370/230 |
| 8,775,631 B2 * | 7/2014 | Luna | ................. H04W 28/0215 |
| | | | 709/226 |

(Continued)

FOREIGN PATENT DOCUMENTS

| | | |
|---|---|---|
| CN | 101137051 A | 3/2008 |
| CN | 101472143 A | 7/2009 |

(Continued)

OTHER PUBLICATIONS

Ooi et al., "DAVIS: Distributed, Automated Video Surveillance," http://nemesys.comp.nus.edu.sg/projects/davis/, pp. 1-3, Networked and Embedded Multimedia Systems Research Group, School of Computing, National University of Singapore (retrieved Dec. 2014).

*Primary Examiner* — Chirag R Patel
(74) *Attorney, Agent, or Firm* — Leydig, Voit & Mayer, Ltd.

(57) ABSTRACT

The embodiments of the present invention provide a bandwidth management device, central management device and method of bandwidth management. The bandwidth management device includes: a first receiver, configured to receive attribute information of media devices; wherein a criticality factor of media device is included in each piece of the attribute information; a second receiver, configured to receive media streaming from the media devices; a bandwidth assigner, configured to assign bandwidth for each piece of media streaming based on the criticality factor. Through the embodiments of the present invention, optimization of bandwidth usage is realized and it is easy to change the critical level of video streaming adaptively.

14 Claims, 10 Drawing Sheets

(51) Int. Cl.
*H04L 12/927* (2013.01)
*H04L 12/24* (2006.01)
*H04L 29/08* (2006.01)

(52) U.S. Cl.
CPC ........ *H04L 43/062* (2013.01); *H04L 47/803* (2013.01); *H04L 47/808* (2013.01); *H04L 67/02* (2013.01); *H04L 43/0882* (2013.01)

(56) References Cited

U.S. PATENT DOCUMENTS

| | | | |
|---|---|---|---|
| 8,914,786 B2* | 12/2014 | Cooley | G06F 8/65 717/168 |
| 2004/0199635 A1* | 10/2004 | Ta et al. | 709/226 |
| 2005/0125563 A1* | 6/2005 | Douglas | 709/250 |
| 2007/0070890 A1 | 3/2007 | Rojahn | |
| 2007/0237138 A1 | 10/2007 | Milstein et al. | |
| 2008/0101410 A1 | 5/2008 | Barkley et al. | |
| 2009/0204707 A1 | 8/2009 | Kamegaya et al. | |
| 2010/0195503 A1* | 8/2010 | Raleigh | H04W 28/0268 370/235 |
| 2010/0299552 A1 | 11/2010 | Schlack et al. | |

FOREIGN PATENT DOCUMENTS

| | | |
|---|---|---|
| CN | 102498715 A | 6/2012 |
| GB | 2461768 A | 1/2010 |
| JP | 2004128953 A | 4/2004 |
| JP | 2007221693 A | 8/2007 |
| JP | 2009171295 A | 7/2009 |
| JP | 2009188884 A | 8/2009 |

* cited by examiner

BANDWIDTH MANAGEMENT DEVICE, CENTRAL MANAGEMENT DEVICE AND METHOD OF BANDWIDTH MANAGEMENT

CROSS-REFERENCE TO RELATED APPLICATIONS

This application is a continuation of International Patent Application No. PCT/CN2013/073991, filed on Apr. 10, 2013, which claims priority to India Patent Application No. IN4500/CHE/2012, filed on Oct. 29, 2012, both of which are hereby incorporated by reference in their entireties.

FIELD OF THE INVENTION

This application relates to media monitoring system and in particular, to a bandwidth management device, central management device and method of bandwidth management.

BACKGROUND

There is a lot of video streaming produced by monitoring devices (such as cameras) in video monitoring system. The video streaming will be transmitted to a remote archiving server through a shared link, so that the bandwidth of the shared link is limited. The limited bandwidth will have a negative impact on the quality of video, and the real-time monitoring may not be realized.

FIG. 1 is a topology diagram showing video streaming produced by many cameras is transmitted in a shared link. As shown in FIG. 1, the shared link has a limited bandwidth, and a lot of video streaming will be transmitted to a remote archiving server.

On the other hand, the video streaming produced by different devices may have different priorities. That is to say, the video streaming produced by some video devices might be critical and should have a higher priority, and the video streaming produced by the other video devices might be not critical and should have a lower priority.

Nowadays, some parameters (such as QoS, DiffServ) may be attached in the video streaming according to the critical level of the video produced by cameras. Those parameters may be supported in a transport layer (such as TCP) such that the critical video streaming may have the QoS with a higher priority, thus the bandwidth used by the video streaming may be increased.

However, the applicant found that the criticality factor is considered only in the transport layer, the optimization of a bandwidth usage is not realized and it is difficult to change the critical level of video streaming adaptively.

SUMMARY

Embodiments of the present invention are directed to a bandwidth management device, central management device and method of bandwidth management, in order to realize the optimization of bandwidth usage.

According a first aspect of the embodiments of the present invention, there is provided a bandwidth management device for streaming media, the bandwidth management device comprising:

a first receiver, configured to receive attribute information of media devices; wherein a criticality factor for indicating importance level of the media device is included in each piece of the attribute information;

a second receiver, configured to receive media streaming from the media devices; and a bandwidth assigner, configured to assign bandwidth for each of media streaming at least based on the criticality factor.

According a second aspect of the embodiments of the present invention, there is provided a central management device for streaming media, the central management device comprising:

a fourth receiver, configured to receive a message from a bandwidth management device, wherein the message requests attribute information of media devices;

a second sender, configured to send attribute information of media devices to a bandwidth management device; wherein a criticality factor for indicating importance level of the media device is included in each of the attribute information, so that the bandwidth management device assigns bandwidth for each of media streaming received from the media devices at least based on a criticality factor.

According a third aspect of the embodiments of the present invention, there is provided a method of bandwidth management for streaming media, the method comprising: receiving attribute information of media devices; wherein a criticality factor for indicating importance level of media device is included in each piece of the attribute information; receiving media streaming from the media devices; and assigning bandwidth for each of media streaming at least based on the criticality factor.

According a fourth aspect of the embodiments of the present invention, there is provided a method of bandwidth management for streaming media, the method comprising: receiving a message from a bandwidth management device, wherein the message requests attribute information of media devices;

sending attribute information of media devices to a bandwidth management device; wherein a criticality factor for indicating importance level of the media device is included in each of the attribute information, so that the bandwidth management device assigns bandwidth for each of media streaming received from the media devices at least based on the criticality factor.

The advantages of the present invention exist in that: criticality factor is considered in a bandwidth management device, thus optimization of bandwidth usage is realized and it is easy to change the critical level of media streaming adaptively.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWING

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The preferred embodiments of the present invention are described as follows in reference to the drawings.

Figure 1:
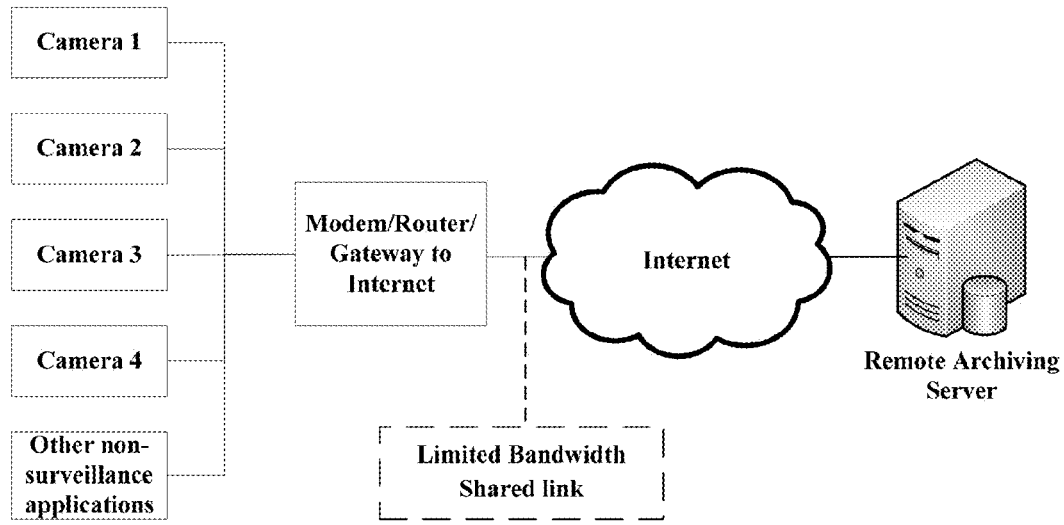
FIG. 1 is a topology diagram of the prior art showing video streaming produced by many cameras is transmitted in a shared link.
Figure 2:
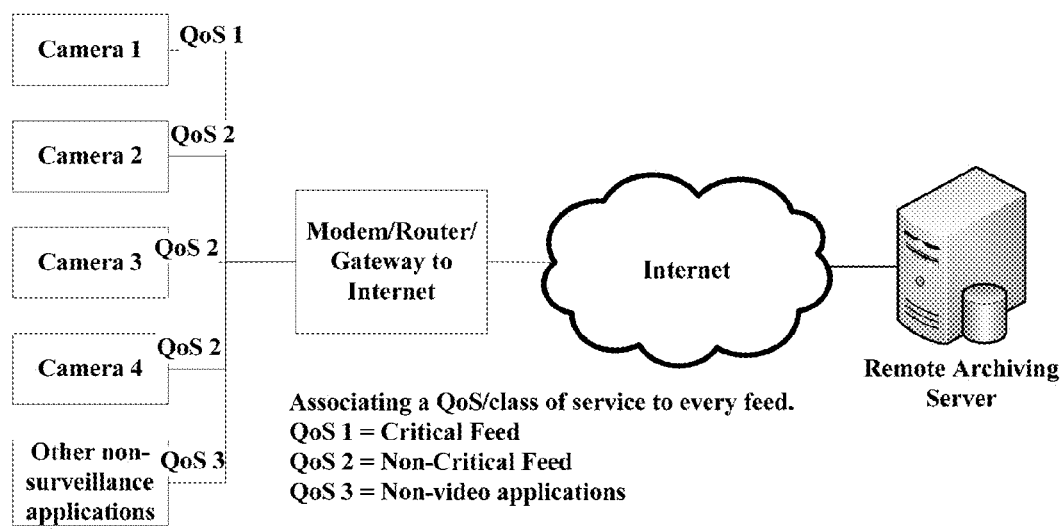
FIG. 2 is a topology diagram of the prior art showing some parameters are attached in the video streaming according to the critical level of the video.

Currently, in one scenario, a criticality factor is considered only in transport layer. FIG. 2 is a topology diagram showing some parameters (such as QoS, DiffServ) are attached in the video streaming according to the critical level of the video.

As shown in FIG. 2, critical video streaming may have QoS with a higher priority, thus the bandwidth used by the video streaming may be increased.

However, user experience of real-time transmission may be affected in this scenario. The reason is that packet losing may happen in this scenario so that there may be some retransmission. Transmission efficiency of network may be decreased. Furthermore, optimization integrated with the content of video may not be performed.

In another scenario, video devices always produce the lowest quality. Bandwidth occupied may be the lowest bandwidth in this way and the bandwidth may be saved as much as possible.

However, video streaming with lower quality may be transmitted even when bandwidth is allowed. That is to say, video devices still transmit the video streaming with the lowest bandwidth (such as 100 Kbps) even when the available bandwidth (such as 2 Mbps) is more than the lowest bandwidth, so that available bandwidth will be wasted. Furthermore, it is difficult to reconfigure the shared bandwidth and to optimize the video streaming.

Embodiment 1

This embodiment of the present invention provides a bandwidth management device for streaming media.

Figure 3:
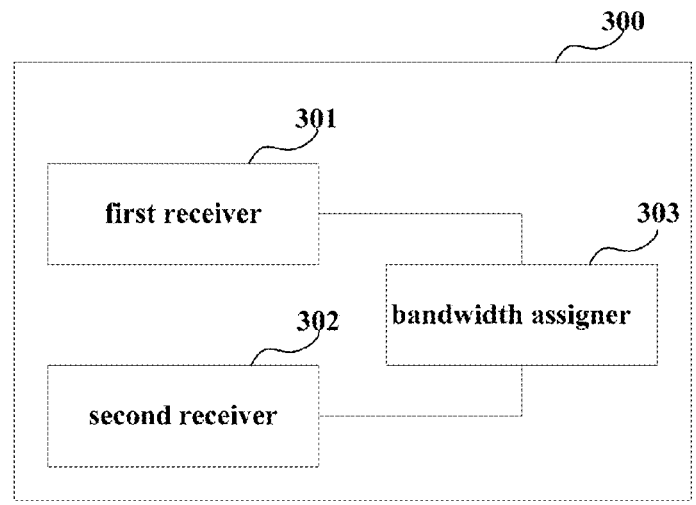
FIG. 3 is a schematic diagram of the bandwidth management device of an embodiment of the present invention.

FIG. 3 is a schematic diagram of the bandwidth management device of an embodiment of the present invention. As shown in FIG. 3, the bandwidth management device 300 includes: a first receiver 301, a second receiver 302 and a bandwidth assigner 303;

Wherein the first receiver 301 is used to receive attribute information of media devices; wherein a criticality factor for indicating importance level of the media device is included in each of the attribute information; the second receiver 302 is used to receive media streaming from the media devices; the bandwidth assigner 303 is used to assign suitable bandwidth for each of media streaming at least based on the criticality factor.

In this embodiment, the media device may be a video device and the media streaming is a video streaming; or may be an audio device and the media streaming is an audio streaming; or may be a video and audio device and the media streaming is a video and audio streaming. Video devices may be provided blew as an example.

In this embodiment, the criticality factor may be used to indicate the importance level of the media device. For example, the criticality factor may be 1 if the media device is the most important monitoring apparatus; the criticality factor may be 5 if the media device is the most unimportant monitoring apparatus.

In this embodiment, the attribute information of media devices may come from a central management device. The bandwidth management device 300 may further include: a first sender (not shown in FIG. 3), the first sender is configured to send a message to request the attribute information of media devices; and the first receiver 301 receives the attribute information from a central management device. However, it is not limited thereto, it may come from other apparatus.

In this embodiment, the bandwidth management device 300 may be a local bandwidth server which can receive video streaming from all video devices in the same local network. Furthermore, the bandwidth management device 300 may communicate with a central server (the central management device) which can provide the attribute information of all video devices.

In this embodiment, the bandwidth management device may be applied in a domain. Furthermore, there may be some bandwidth management devices in the whole network; and each bandwidth management device works in a domain. However, it is not limited thereto, and particular manner may be determined as actually required.

Figure 4:
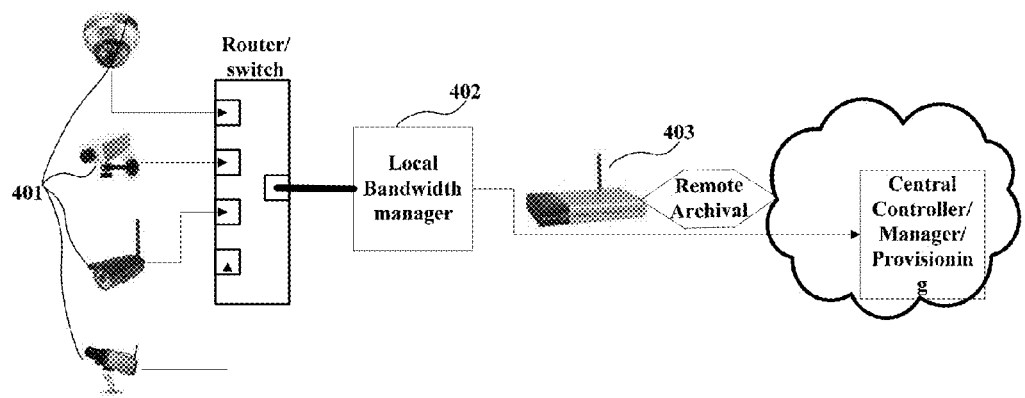
FIG. 4 is a topology diagram showing the bandwidth management device in a network of an embodiment of the present invention.

FIG. 4 is a topology diagram showing the bandwidth management device in a network. As shown in FIG. 4, there are some video devices 401, a bandwidth management device 402 and a central management device 403. The bandwidth management device 402 uses criticality factor for all the video devices 401; so that the bandwidth management device 402 may transcode the stream with lower priority at lower bandwidth and transcode the stream with higher priority at higher bandwidth.

Figure 5:
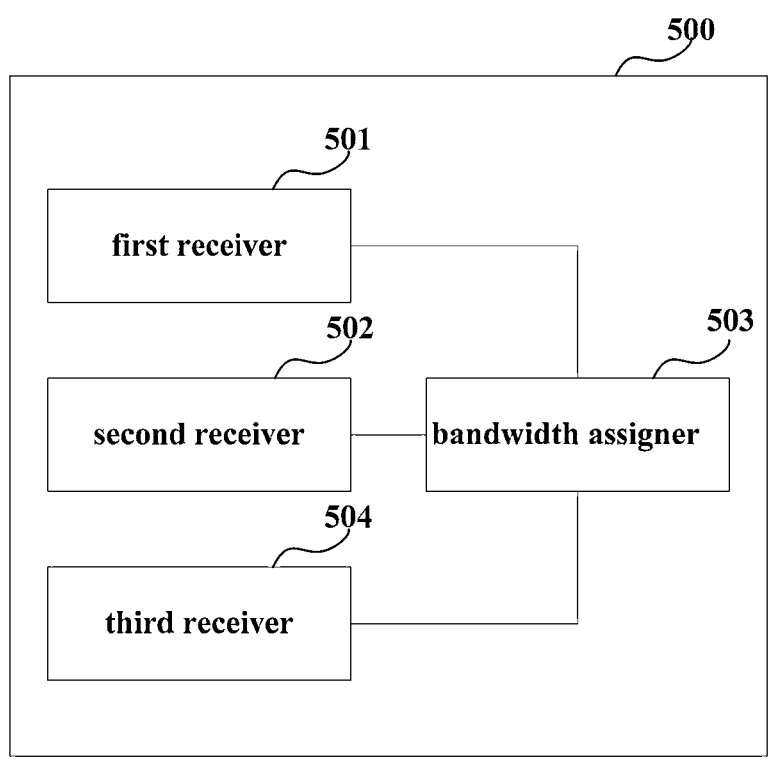
FIG. 5 is another schematic diagram of the bandwidth management device of an embodiment of the present invention.

FIG. 5 is another schematic diagram of the bandwidth management device of an embodiment of the present invention. As shown in FIG. 5, the bandwidth management device 500 includes: a first receiver 501, a second receiver 502 and a bandwidth assigner 503;

As shown in FIG. 5, the bandwidth management device 500 further includes: a third receiver 504, the third receiver 504 is used to receive an available bandwidth value; and the bandwidth assigner 503 is further used to assign suitable bandwidth for each of media streaming based on the criticality factor and the available bandwidth value.

In this embodiment, the available bandwidth value may come from the central management device. However, it is not limited thereto, it may come from other apparatus.

In implement, the available bandwidth value may be included in the attribute information. In another way, the available bandwidth may be sent by the central management device separately. However, it is not limited thereto, and particular manner may be determined as actually required.

Furthermore, an activity factor for indicating active level of media device may be included in each of the attribute information. For example, the activity factor may be 1 if the media device is the most active monitoring apparatus (for example, the media device produces media streaming at any time); the activity factor may be 5 if the media device is the most inactive monitoring apparatus (for example, the media device produces media streaming only at 6:00-7:00 AM in every day).

Table 1 has shown an example of the attribute information in which the available bandwidth value and the activity factor are included. The attribute information is sent by the central management device.

As shown in table 1, there are four video devices 1-4 and each video device has three attribute fields: ID, criticality factor and activity factor (on activity detection). Furthermore, an available bandwidth value for the bandwidth management device is included.

TABLE 1

| Local attribute information | | | |
|---|---|---|---|
| Name | | MG Road, Office | |
| Available bandwidth | | 5 Mbps | |
| Device 1 | | Device 2 | |
| ID | xyz | ID | abc |
| Criticality Factor | 1 | Criticality Factor | 2 |
| On Activity Detection | NA | On Activity Detection | 0 |
| Device 3 | | Device 4 | |
| ID | pqr | ID | lmn |
| Criticality Factor | 3 | Criticality Factor | 5 |
| On Activity Detection | 1 | On Activity Detection | 2 |

Wherein, the criticality factor is from 1 to 5 and 1 is the highest, 5 is the lowest. Furthermore, the criticality factor may be changed dynamically according to the activity level of the device.

In implement, the bandwidth assigner 503 is specifically configured to assign the required bandwidth directly for each of media streaming when the total bandwidth of media streaming from the media devices is less than or equal to the available bandwidth value.

Furthermore, the bandwidth assigner 503 is specifically configured to reduce bandwidth demand of the media devices according to the criticality factor; and assign bandwidth for each of media streaming based on the reduced bandwidth demand when the total bandwidth of video streaming from the video devices or video domains is more than the available bandwidth value.

Table 2 has shown an example of how to deal with when the total bandwidth of media streaming from the media devices is more than the available bandwidth value.

TABLE 2

```
For each device in the domain; do
      Device_CurrentPriorityThreshold[devnum] =
      calcPriorityThresholdBasedOnCriticalityFactor;
      done
      While(actual_bandwidth_needed > max_domain_bandwidth); do
            Device = GetLowestPriorityDevice
            Device->BandwidthToUse -= 100kbps . . .
reduce the bandwidth to use for
the device by a certain threshold factor (for e.g. 100 kbps)
            Increase the priority threshold of the Device by 1 . . .
This will ensure that
all the devices participate in sharing the reduced bandwidth factor.
            actual_bandwidth_needed -= 100 kbps
      Done
      Inform all the corresponding Video Rate
Controllers to lower the bandwidth usage
by Device->BandwidthToUse.
```

In implement, video rate may be reduced when the total bandwidth of video streaming from the video devices is more than the available bandwidth value.

Figure 6:
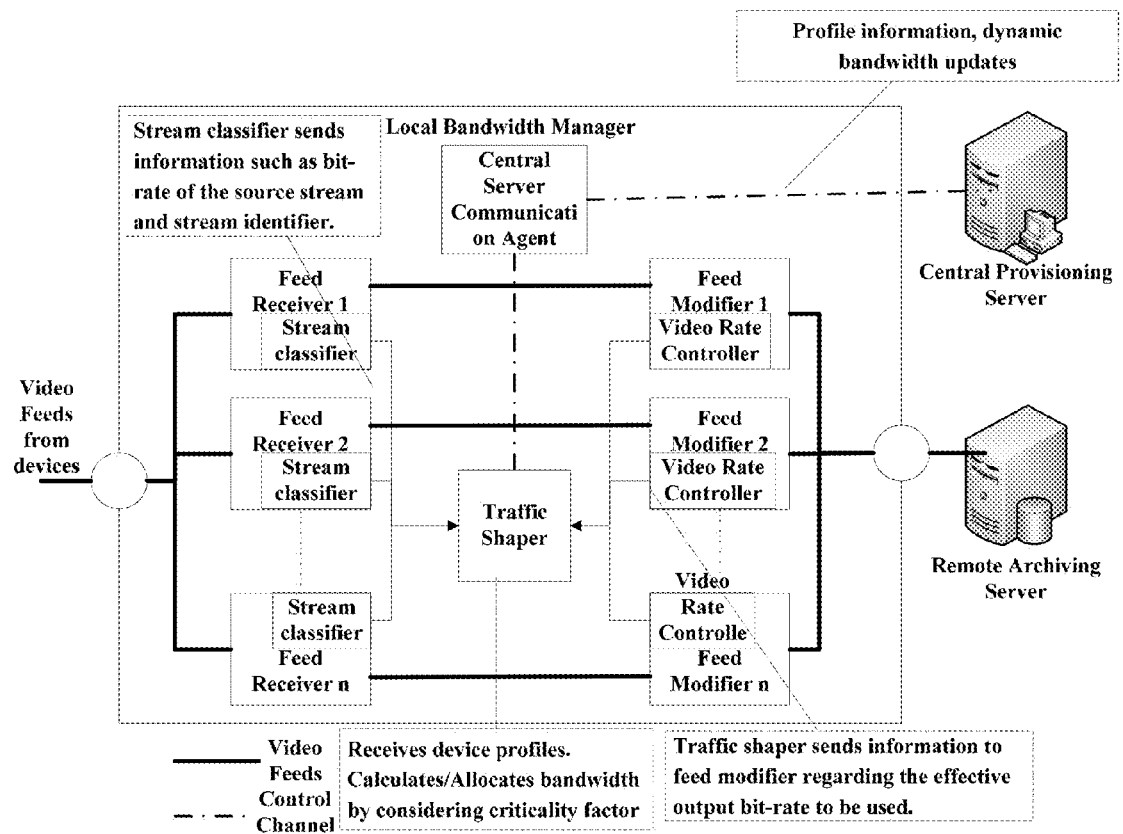
FIG. 6 is an example of another schematic diagram of the bandwidth management device of an embodiment of the present invention.

FIG. 6 is an example of another schematic diagram of the bandwidth management device. As shown in FIG. 6, local bandwidth manager (bandwidth management device) may receive profile information (attribute information) and update available bandwidth value dynamically.

As shown in FIG. 6, there are some feed receivers to receive video feed from video devices; stream classifier sends information such as bit-rate of the source stream and stream identifier.

As shown in FIG. 6, the traffic shaper receives device profile information and calculates/allocates bandwidth by considering criticality factor. Furthermore, the traffic shaper sends information to feed modifier regarding the effective output bit-rate to be used.

In implement, the criticality factor of the video device or video domain may be updated, the bandwidth management device may further include: a first updater (not shown in Figure), configured to update the criticality factor for indicating importance level of the media device; and the bandwidth assigner may further reassign suitable bandwidth for each of video streaming based on the changed criticality factor.

In implement, the first updater may update the criticality factor directly; or may receive update information from other devices such as the central management device, such that the first updater updates the criticality factor based on the update information.

In some scenarios, some cameras may have higher priority in some periods of time. For example, cameras in working areas may have a higher priority in working time (such as from 8:00 AM to 6:00 PM) and have a lower priority in non-working time (such as from 6:00 PM to 8:00 AM of the next day).

So that the criticality factor of the media device may be updated dynamically. The bandwidth assigner may further reassign suitable bandwidth for each of media streaming based on the changed criticality factor.

In implement, the available bandwidth value may be updated; and the bandwidth assigner further reassigns suitable bandwidth for each of media streaming based on the criticality factor and the updated available bandwidth value.

In some scenarios, bandwidth of the shared link may be used by video and non-video. Sometimes the available bandwidth of the video may be updated dynamically. For example, the available bandwidth of video devices may be 4 Mbps and the bandwidth of non-video may be 6 Mbps in working time (such as from 8:00 AM to 6:00 PM); the available bandwidth of video devices may be 6 Mbps and the bandwidth of non-video may be 4 Mbps in non-working time (such as from 6:00 PM to 8:00 AM of the next day).

So that the available bandwidth value may be changed dynamically; the bandwidth assigner may further reassign suitable bandwidth for each of media streaming based on the criticality factor and the updated available bandwidth value. Furthermore, whole optimization of bandwidth usage may be realized and it is easy to change the critical level of video streaming adaptively.

In implement, the activity factor of the media device may be updated, the bandwidth management device may further include: a second updater (not shown in Figure), configured to update the activity factor; and the bandwidth assigner further reassigns suitable bandwidth for each of media streaming based on the criticality factor and the updated activity factor.

In implement, the second updater may update the activity factor directly; or may receive update information from other devices such as the central management device, such that the second updater updates the activity factor based on the update information.

It can be seen from the above embodiment that criticality factor is considered in a bandwidth management device, thus user experience of real-time transmission is improved; furthermore, whole optimization of bandwidth usage is realized and it is easy to change the critical level of media streaming adaptively.

Embodiment 2

This embodiment of the present invention provides a method of bandwidth management for streaming media. This embodiment corresponds to the above embodiment 1, applied in a bandwidth management device; and the same content will not be described.

Figure 7:
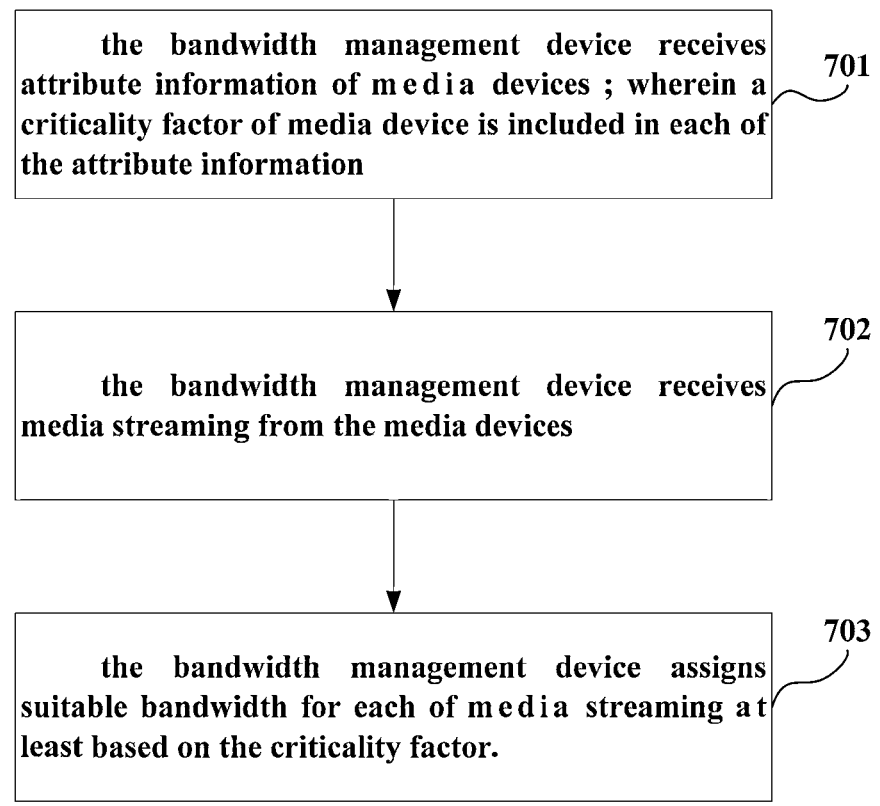
FIG. 7 is a flowchart of the method of bandwidth management of an embodiment of the present invention.

FIG. 7 is a flowchart of the method of an embodiment of the present invention.

As shown in FIG. 7, the method includes:

Step 701, the bandwidth management device receives attribute information of media devices; wherein a criticality factor for indicating importance level of media device is included in each of the attribute information;

Step 702, the bandwidth management device receives media streaming from the media devices;

Step 703, the bandwidth management device assigns suitable bandwidth for each of media streaming at least based on the criticality factor.

In this embodiment, the bandwidth management device may be a local bandwidth server which can receive video streaming from all video devices in the same local network. Furthermore, the bandwidth management device may communicate with a central server (the central management device) which can provide the attribute information of all video devices.

In this embodiment, an activity factor for indicating active level of media device may be included in each of the attribute information; and the step 703 further assigns suitable bandwidth for each of media streaming based on the criticality factor and the activity factor.

Figure 8:
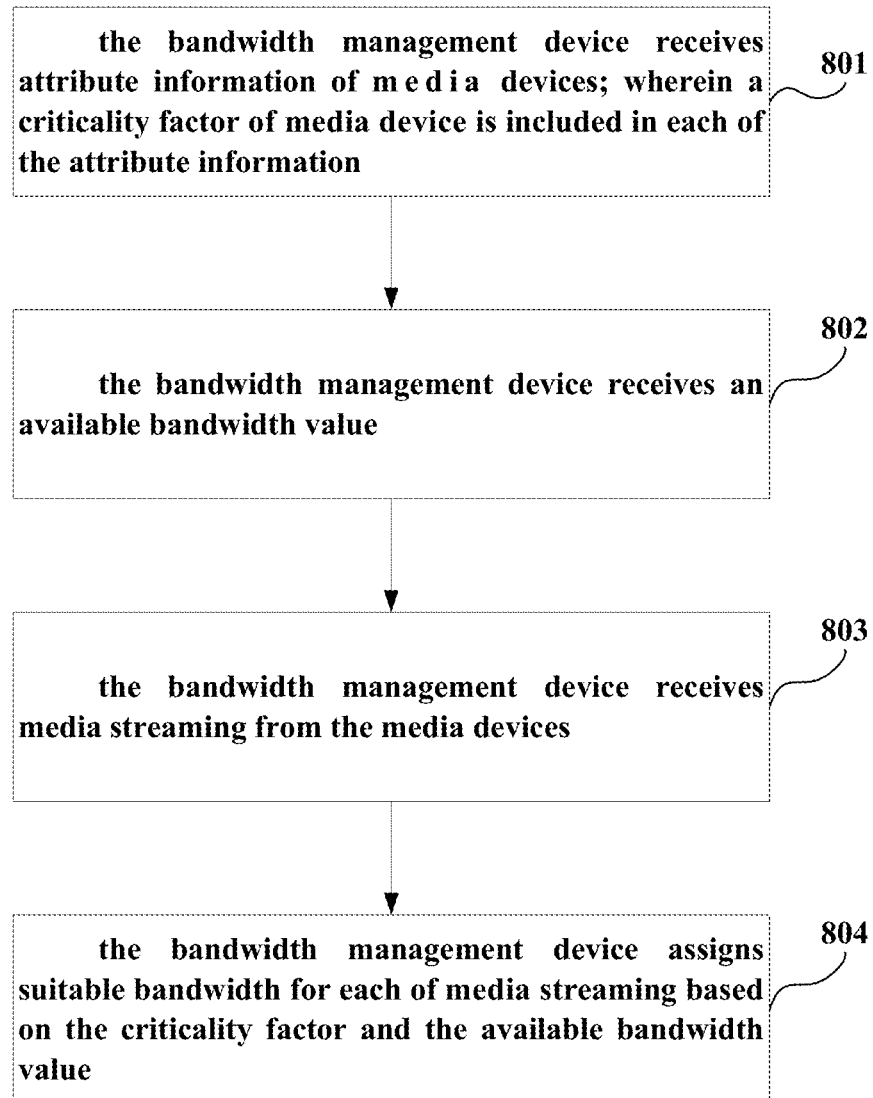
FIG. 8 is another flowchart of the method of bandwidth management of an embodiment of the present invention.

FIG. 8 is another flowchart of the method of an embodiment of the present invention.

As shown in FIG. 8, the method includes:

Step 801, the bandwidth management device receives attribute information of media devices; wherein a criticality factor of media device is included in each of the attribute information;

Step 802, the bandwidth management device receives an available bandwidth value;

Step 803, the bandwidth management device receives media streaming from the media devices;

Step 904, the bandwidth management device assigns suitable bandwidth for each of media streaming based on the criticality factor and the available bandwidth value.

In this embodiment, an activity factor may be included in each of the attribute information; and the step 804 further assigns suitable bandwidth for each of media streaming based on the criticality factor, the activity factor and the available bandwidth value.

In implement, the step 804 specifically assigns the required bandwidth directly for each of video streaming when the total bandwidth of media streaming from the media devices is less than or equal to the available bandwidth value.

Furthermore, the step 804 specifically reduces bandwidth demand of the media devices according to the criticality factors when the total bandwidth of media streaming from the media devices is more than the available bandwidth value; and assigns bandwidth for each of media streaming based on the reduced bandwidth demand.

Figure 9:
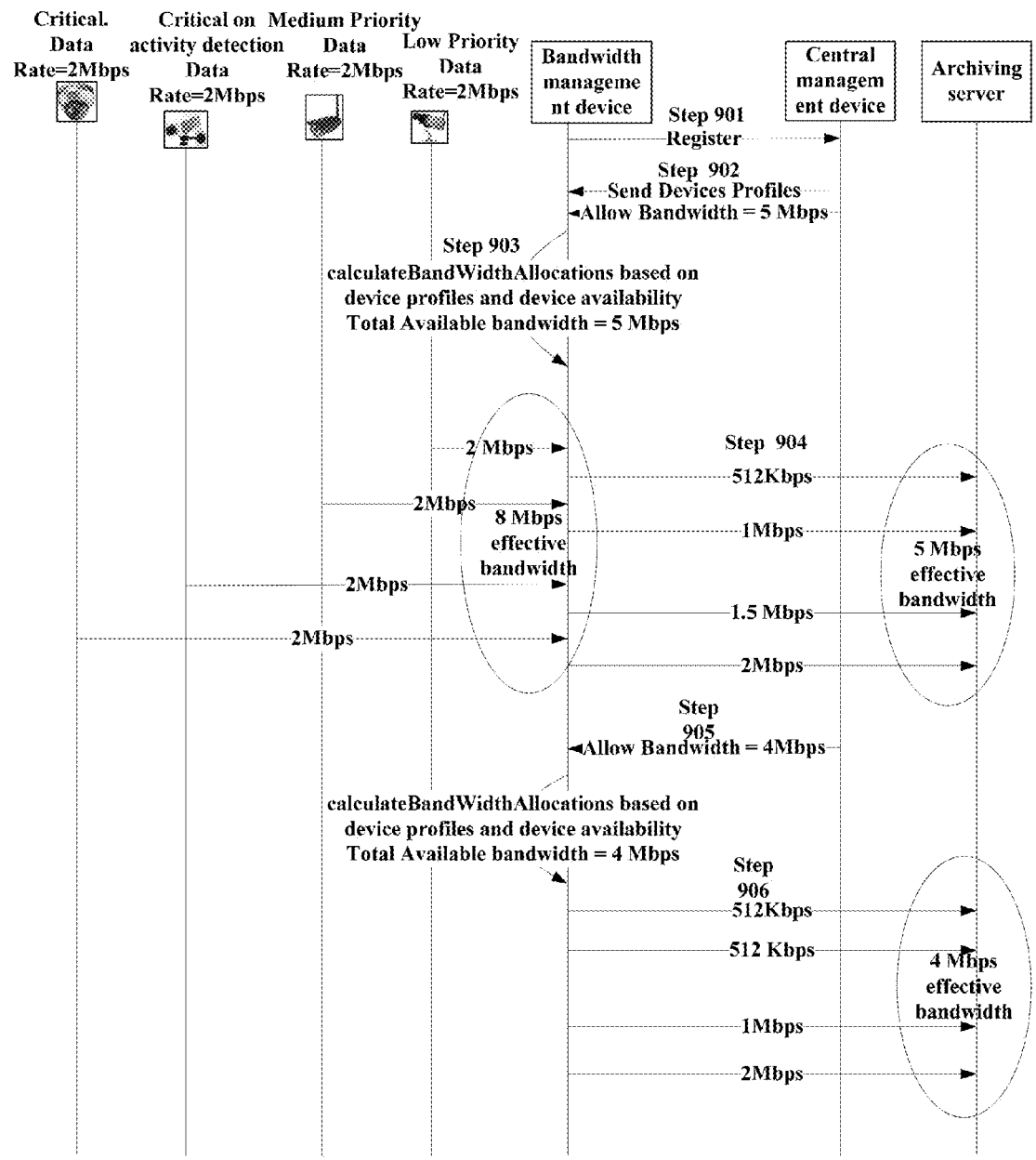
FIG. 9 is an example of another flowchart of the method of bandwidth management in the present invention.

FIG. 9 is an example of another flowchart of the method in the present invention. As shown in FIG. 9, there are four video devices, a bandwidth management device (local bandwidth manager) and a central management device (central manager) in this example; furthermore, there is an archiving server.

As shown in FIG. 9, the method includes:

Step 901, the local bandwidth manager registers in the central manager.

Step 902, the central manager send attribute information of the video devices; wherein the criticality factor of each video device is included in the attribute information.

In this example, an available value is included in the attribute information. In detail, these parameters are shown in table 1. That is to say, the criticality factor of device 1 is 1; the criticality factor of device 2 is 2; the criticality factor of device 3 is 3; the criticality factor of device 4 is 5; the available bandwidth value (max domain bandwidth) is 5 Mbps.

Step 903, the local bandwidth manager receives the video streaming from the video devices and calculates the required bandwidth (actual_bandwidth needed).

In one scenario, date rate of each video device is 1 Mbps and the total required bandwidth of video devices is 4 Mbps. The required bandwidth is less than the available bandwidth, so the local bandwidth manager assigns 1 Mbps directly for each video device.

In another scenario, date rate of each video device is 2 Mbps and the total required bandwidth of video devices is 8 Mbps. The required bandwidth is more than the available bandwidth, so that the local bandwidth manager will reduce bandwidth demand the video devices according to the criticality factor and assign the bandwidth for each of media streaming based on the reduced bandwidth demand.

In this scenario, as shown in FIG. 9, the local bandwidth manager will assign 2 Mbps for device 1; assign 1.5 Mbps for device 2; assign 1 Mbps for device 3 and assign 512 Kbps for device 4.

Step 904, the video streaming may be send to the archiving server using the assigned bandwidth.

As shown in FIG. 9, the available bandwidth value may be updated; and the bandwidth management device may further reassign suitable bandwidth for each of video streaming based on the criticality factor and the updated available bandwidth value.

As shown in FIG. 9, the method may further include:

Step 905, the local bandwidth manager receives an updated available bandwidth value.

In this example, the updated available value is 4 Mbps. The date rate of each video device is 2 Mbps and the total required bandwidth of video devices is 8 Mbps. The required bandwidth is more than the available bandwidth, so that the local bandwidth manager will reduce bandwidth demand of the video devices according to the criticality factor and assign the bandwidth for each of media streaming based on the reduced bandwidth demand.

In this scenario, as shown in FIG. 9, the local bandwidth manager will assign 2 Mbps for device 1; assign 1 Mbps for device 2; assign 512 Kbps for device 3 and assign 512 Kbps for device 4.

Step 906, the video streaming may be send to the archiving server using the assigned bandwidth.

In this embodiment, the criticality factor of the media devices may be updated; and the local bandwidth device may further reassign suitable bandwidth for each of media streaming based on the changed criticality factor.

In this embodiment, the activity factor of the media device may be updated; and the local bandwidth device further reassign suitable bandwidth for each of media streaming based on the criticality factor and the updated activity factor.

Another example is provided in this embodiment. In this example, camera 1 is employed in admin room and the criticality factor is 3; camera 2 is employed in storage room and the criticality factor is 1; camera 3 is employed in passage way and the criticality factor is 5; camera 4 is employed in reception room and the criticality factor is 5; and the available bandwidth value is 2 Mbps. In detail, these parameters of attribute information are shown in table 3.

TABLE 3

| Local attribute information | | | |
|---|---|---|---|
| Name<br>Available bandwidth | | XYZ organization<br>2 Mbps | |
| Device 1 | | Device 2 | |
| ID | Admin room | ID | Storage room |
| Criticality Factor | 3 | Criticality Factor | 1 |
| On Activity Detection | NA | On Activity Detection | NA |
| Device 3 | | Device 4 | |
| ID | Passage way | ID | Reception room |
| Criticality Factor | 5 | Criticality Factor | 5 |
| On Activity Detection | NA | On Activity Detection | 3 |

In this example, original video rate of each video device is 750 Kbps and the total required bandwidth is 3 Mbps. The bandwidth management device has to reduce bandwidth demand according to the criticality factor because that the total required bandwidth is less than available bandwidth value.

In one scenario, the local bandwidth manager may assign 512 Kbps for device 1; assign 750 Kbps for device 2; assign 400 Kbps for device 3 and assign 400 Kbps for device 4. So that the total required bandwidth is about 2 Mbps.

In another scenario, the local bandwidth manager may receive an updated available bandwidth value (such as 2.5 Mbps). The local bandwidth manager may reassign bandwidth for each video device; and video rate of each video streaming may be changed according to the reassigned bandwidth.

In another scenario, new camera may be added in this domain and the added camera has its criticality factor. The local bandwidth may reassign bandwidth based on criticality factor of each video device in this domain.

In another scenario, activity level of some video devices may be changed. That is to say, the activity factor of the video device may be updated dynamically.

In this example, the activity level of device 4 is changed from 3 to 4. So that it may assign 512 Kbps for device 1; assign 750 Kbps for device 2; assign 300 Kbps for device 3 and assign 500 Kbps for device 4.

It can be seen from the above embodiment that criticality factor is considered in a bandwidth management device, thus user experience of real-time transmission is improved; furthermore, whole optimization of bandwidth usage is realized and it is easy to change the critical level of media streaming adaptively.

Embodiment 3

This embodiment of the present invention provides a central management device for streaming media. This embodiment corresponds to the above embodiment 1; and the same content will not be described.

Figure 10:
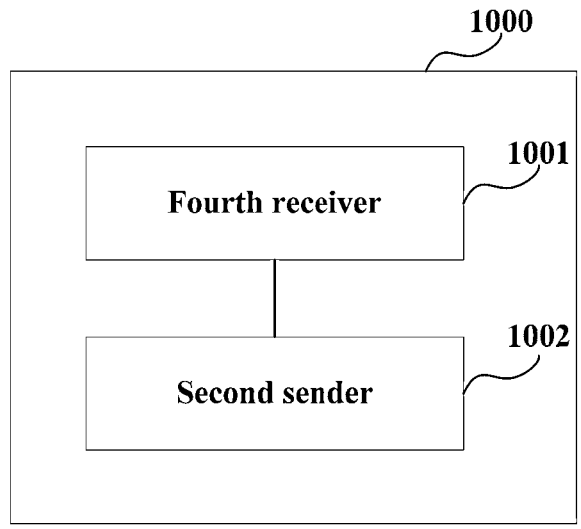
FIG. 10 is a schematic diagram of the central manager of an embodiment of the present invention.

FIG. 10 is a schematic diagram of the central management device of an embodiment of the present invention. As shown in FIG. 10, the central management device 1000 includes: a fourth receiver 1001 and a second sender 1002; other parts of the central management 1000 can refer to the prior art and the content will not be described there.

Wherein the fourth receiver 1001 is configured to receive a message from a bandwidth management device, wherein the message requests attribute information of media devices; the second sender 1002 is used to send attribute information of media devices to the bandwidth management device; wherein a criticality factor of media device is included in each of the attribute information.

In this embodiment, the central management device 1000 may further include: a third sender (not shown in FIG. 10). The third sender is used to send an available bandwidth value to the bandwidth management device.

In this embodiment, an activity factor for indicating active level of the media device may be included in each of the attribute information.

It can be seen from the above embodiment that criticality factor is considered in a bandwidth management device, thus user experience of real-time transmission is improved; furthermore, whole optimization of bandwidth usage is realized and it is easy to change the critical level of media streaming adaptively.

Embodiment 4

This embodiment of the present invention provides a method of bandwidth management for streaming media. This embodiment corresponds to the method in the above embodiment 3, applied in a central management device; and the same content will not be described.

Figure 11:
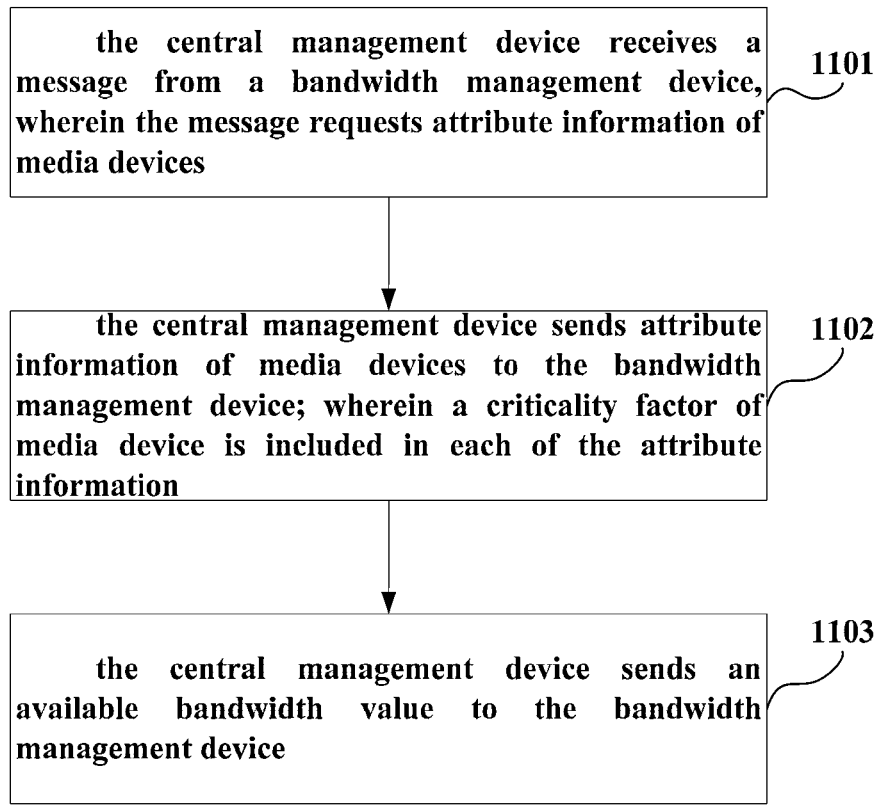
FIG. 11 is a flowchart of the method of bandwidth management of an embodiment of the present invention.

FIG. 11 is a flowchart of the method of an embodiment of the present invention.

As shown in FIG. 11, the method includes:

Step 1101, the central management device receives a message from a bandwidth management device, wherein the message requests attribute information of media devices;

Step 1102, the central management device sends attribute information of media devices to the bandwidth management device; wherein a criticality factor of media device is included in each of the attribute information.

As shown in FIG. 11, the method may further include:

Step 1103, the central management device sends an available bandwidth value to the bandwidth management device.

In this embodiment, an activity factor for indicating active level of the media device may be included in each of the attribute information.

It can be seen from the above embodiment that criticality factor is considered in a bandwidth management device, thus user experience of real-time transmission is improved; furthermore, whole optimization of bandwidth usage is realized and it is easy to change the critical level of media streaming adaptively.

Embodiment 5

This embodiment of the present invention provides a LBM (Local Bandwidth Management) system, the LBM system includes: a plurality of media devices and a LBM device (corresponds to the bandwidth management device as described in embodiment 1).

Figure 12:
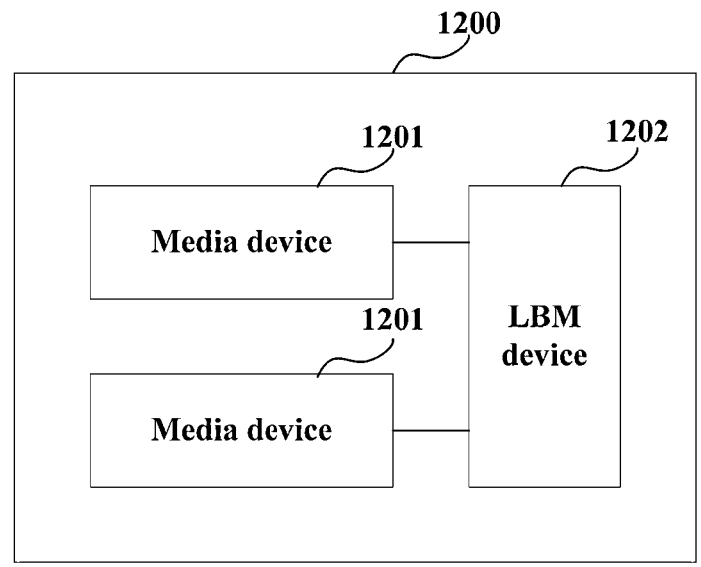
FIG. 12 is a schematic diagram of the LBM system of the present invention.

FIG. 12 is a schematic diagram of the LBM system of the present invention. As shown in FIG. 12, the LBM system 1200 includes: at least two media devices 1201 and a LBM device 1202;

Wherein the media device 1201 is configured to produce media streaming; the LBM device 1202 is configured to receive attribute information of media devices; receive media streaming from the media devices and assign bandwidth for each of media streaming at least based on the criticality factor; wherein a criticality factor for indicating importance level of the media device is included in each of the attribute information.

In this embodiment, the LBM system may further include a central management device (not shown in FIG. 12). The central management device is configured to send the attribute information of media devices to the LBM device.

This embodiment of the present invention further provides a DBM (Domain Bandwidth Management) system, the DBM system includes two or more LBM systems.

Figure 13:
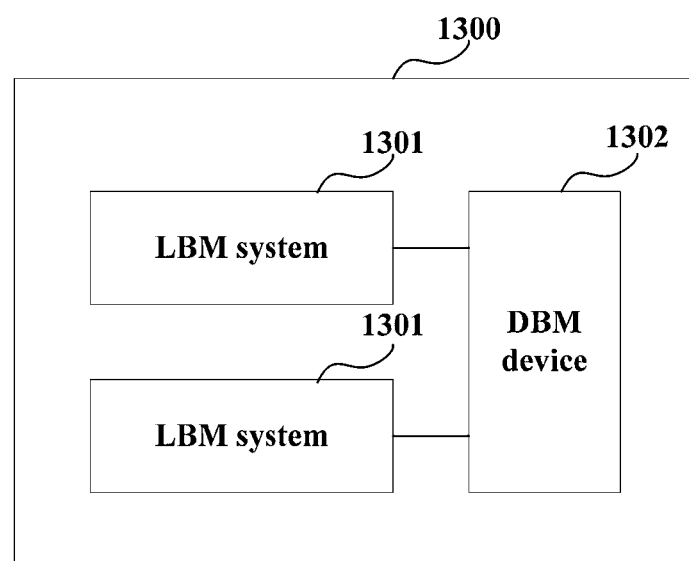
FIG. 13 is a schematic diagram of the DBM system of the present invention.

FIG. 13 is a schematic diagram of the DBM system of the present invention. As shown in FIG. 13, the DBM system 1300 includes: at least two LBM systems 1301 and a DBM device 1302;

Wherein the LBM system 1301 is described as above embodiment; the DBM device 1302 is configured to receive attribute information of the at least LBM systems; receive media streaming from the LBM systems and assign bandwidth for each of media streaming at least based on the criticality factor; wherein a criticality factor for indicating importance level of the LBM system is included in each of the attribute information.

In this embodiment, a plurality of domains (corresponds to the LBM system) also may be considered and some local bandwidth management device (corresponds to the LBM device) may work in parallel.

Figure 14:
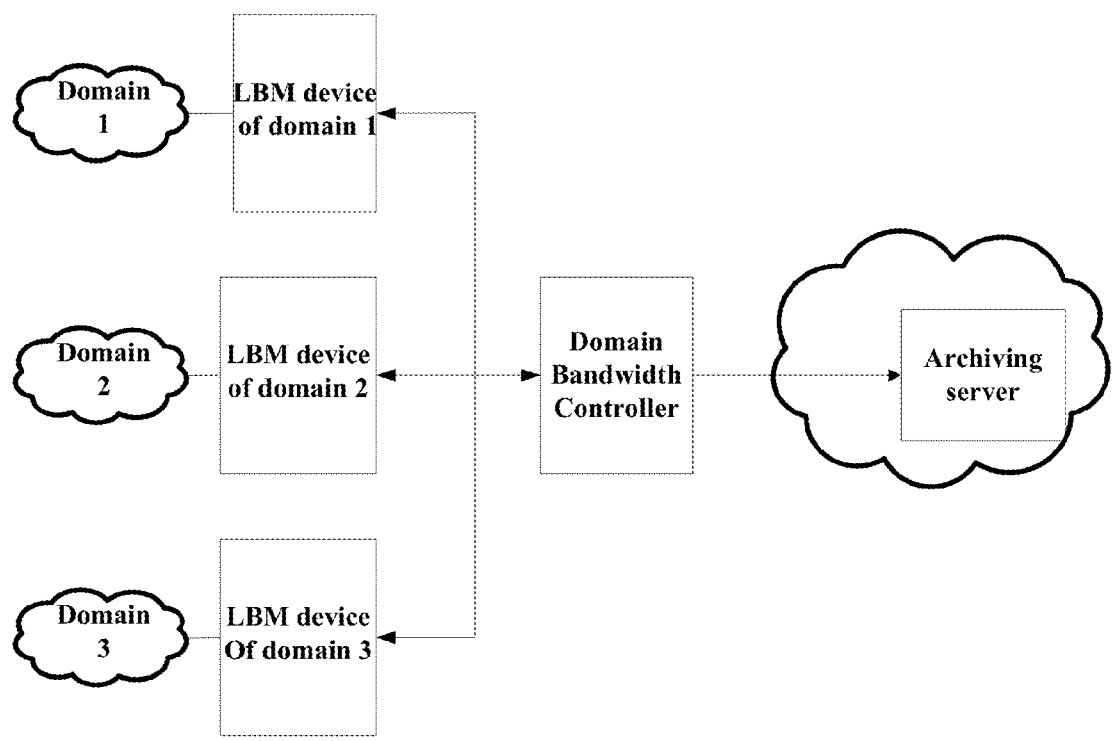
FIG. 14 is an example of another schematic diagram showing some domains of an embodiment of the present invention.

FIG. 14 is an example of a schematic diagram showing some bandwidth management devices. As shown in FIG. 14, there are three domains (corresponds to the LBM system) and a domain bandwidth controller (corresponds to the DBM device).

For example, in domain 1, original effective bandwidth=10 Mbps but effective bandwidth=8 Mbps since certain devices criticalness is less; in domain 2, original effective bandwidth=10 Mbps but effective bandwidth=6 Mbps since certain devices criticalness is less; in domain 3, original effective bandwidth=10 Mbps but effective bandwidth=6 Mbps since certain devices criticalness is less.

After considering criticalness of all domains, the domain controller can further reduce the bandwidth usage at its tier. Since domain 2 and domain 3 are relatively lower priority domains, the effective bandwidth may be 14 Mbps finally. It should be note that this could have been 20 Mbps without the domain controller. The embodiments of the present invention further provide a computer-readable program, wherein when the program is executed in a bandwidth management device; the program enables the computer to carry out the method of bandwidth management for streaming media.

The embodiments of the present invention further provide a storage medium in which a computer-readable program is stored, wherein the computer-readable program enables the computer to carry out the method of bandwidth management for streaming media.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A bandwidth management device for streaming media, the bandwidth management device comprising:
   a first receiver, configured to receive attribute information of media devices; wherein a criticality factor for indicating an importance level of each of the media devices and an activity factor for indicating an active level of each of the media devices are included in each piece of the attribute information, the activity level reflecting how often the media device generates and sends the media streaming during a time period;
   a second receiver, configured to receive media streaming from the media devices; and
   a bandwidth assigner, configured to assign an adaptive bandwidth for each piece of the media streaming at least based on the criticality factor and the activity factor each piece of the media streaming and an available bandwidth value.

2. The bandwidth management device according to claim 1, the bandwidth management device further comprising:
   a first sender, configured to send a message to a central management device for requesting the attribute information of the media devices;
   wherein the first receiver is further configured to receive the attribute information of the media devices from the central management device.

3. The bandwidth management device according to claim 1, wherein the bandwidth assigner is configured to reduce bandwidth demand of the media devices according to criticality factors, and assign the bandwidth for each piece of media streaming based on the reduced bandwidth demand, if a total bandwidth of the media streaming from the media devices is more than the available bandwidth value.

4. The bandwidth management device according to claim 1, wherein the available bandwidth value is updated; and
   the bandwidth assigner is further configured to reassign the adaptive bandwidth for each piece of the media streaming based on the criticality factor, the activity factor and the updated available bandwidth value.

5. The bandwidth management device according to claim 1, wherein the bandwidth management device further comprising:
   a first updater, configured to update the criticality factor for indicating the importance level of each of the media devices; and
   the bandwidth assigner is further configured to reassign an adaptive bandwidth for each piece of the media streaming based on the updated criticality factor and the activity factor.

6. The bandwidth management device according to claim 1, wherein the bandwidth management device further comprising:
   a second updater, configured to update the activity factor of the media device; and the bandwidth assigner is further configured to reassign the adaptive bandwidth for each piece of the media streaming based on the criticality factor and the updated activity factor.

7. A central management device for streaming media, the central management device comprising:
 a receiver, configured to receive a message from a bandwidth management device, wherein the message requests attribute information of media devices;
 a first sender, configured to send the attribute information of the media devices to the bandwidth management device, wherein a criticality factor for indicating an importance level of each of the media devices and an activity factor for indicating an active level of each of the media devices are included in each of the attribute information, the activity level reflecting how often the media device generates and sends the media streaming during a time period, to enable the bandwidth management device to assign an adaptive bandwidth for each piece of the media streaming received from the media devices at least based on the criticality factor and the activity factor and an available bandwidth value.

8. A method of bandwidth management for streaming media, the method comprising:
 receiving attribute information of media devices; wherein a criticality factor for indicating an importance level of each of the media devices and an activity factor for indicating an active level of each of the media devices are included in each piece of the attribute information, the activity level reflecting how often the media device generates and sends the media streaming during a time period;
 receiving media streaming from the media devices; and
 assigning an adaptive bandwidth for each piece of the media streaming at least based on the criticality factor and the activity factor, and an available bandwidth value.

9. The method according to claim 8, wherein the method further comprising:
 sending a message to a central management device for requesting the attribute information of the media devices;
 the receiving the attribute information of the media devices comprises:
 receiving the attribute information of the media devices from the central management device.

10. The method according to claim 8, wherein the assigning the bandwidth for each piece of the media streaming based on the criticality factor, the activity factor and the available bandwidth value comprises:
 reducing bandwidth demand of the media devices according to the criticality factors when a total bandwidth of the media streaming from the media devices is more than the available bandwidth value; and
 assigning the bandwidth for each piece of the media streaming based on the reduced bandwidth demand.

11. The method according to claim 8, wherein the available bandwidth value is updated, the method further comprises:
 reassigning the adaptive bandwidth for each piece of the media streaming based on the criticality factor, the activity factor and the updated available bandwidth value.

12. The method according to claim 8, wherein the criticality factor for indicating an importance level of the media device is updated, the method further comprises:
 reassigning the bandwidth for each piece of the media streaming based on the updated criticality factor and the activity factor.

13. The method according to claim 10, wherein the activity factor of the media device is updated, the method further comprises:
 reassigning the bandwidth for each piece of the media streaming based on the criticality factor and the updated activity factor.

14. A method of bandwidth management for streaming media, the method comprising:
 receiving a message from a bandwidth management device, wherein the message requests attribute information of media devices; and
 sending the attribute information of the media devices to the bandwidth management device, wherein a criticality factor for indicating an importance level of each of the media devices and an activity factor for indicating an active level of each of the media devices are included in each of the attribute information, the activity level reflecting how often the media device generates and sends the media streaming during a time period, to enable the bandwidth management device to assign an adaptive bandwidth for each piece of the media streaming received from the media devices at least based on the criticality factor and the activity factor and an available bandwidth value.

* * * * *